(No Model.) 3 Sheets—Sheet 1.

J. GIBBINS.
CLUTCH.

No. 396,079. Patented Jan. 15, 1889.

Witnesses
Fred G. Dieterich
H. A. Draper

Inventor
James Gibbins
by Allen Webster
Attorney (No Model.) 3 Sheets—Sheet 2.

J. GIBBINS.
CLUTCH.

No. 396,079. Patented Jan. 15, 1889.

Witnesses
Fred G. Dieterich
H. A. Draper

Inventor
James Gibbins
By Allen Webster
Attorney (No Model.) 3 Sheets—Sheet 3.
J. GIBBINS.
CLUTCH.
No. 396,079. Patented Jan. 15, 1889.
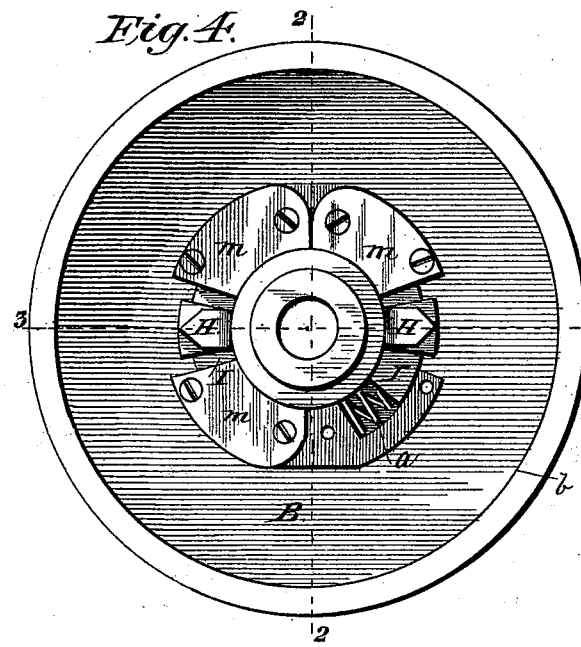
Fig. 4.
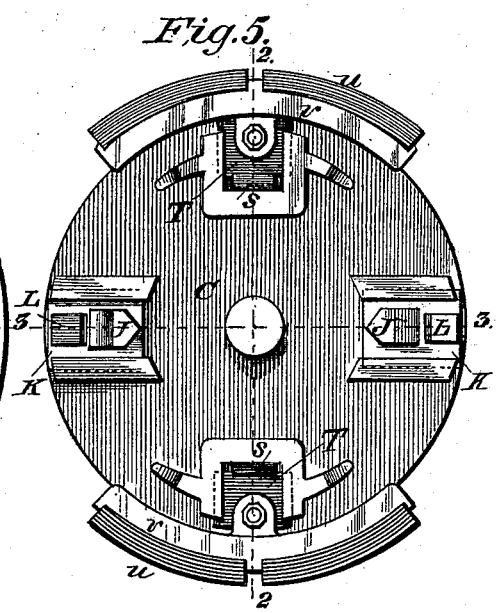
Fig. 5.
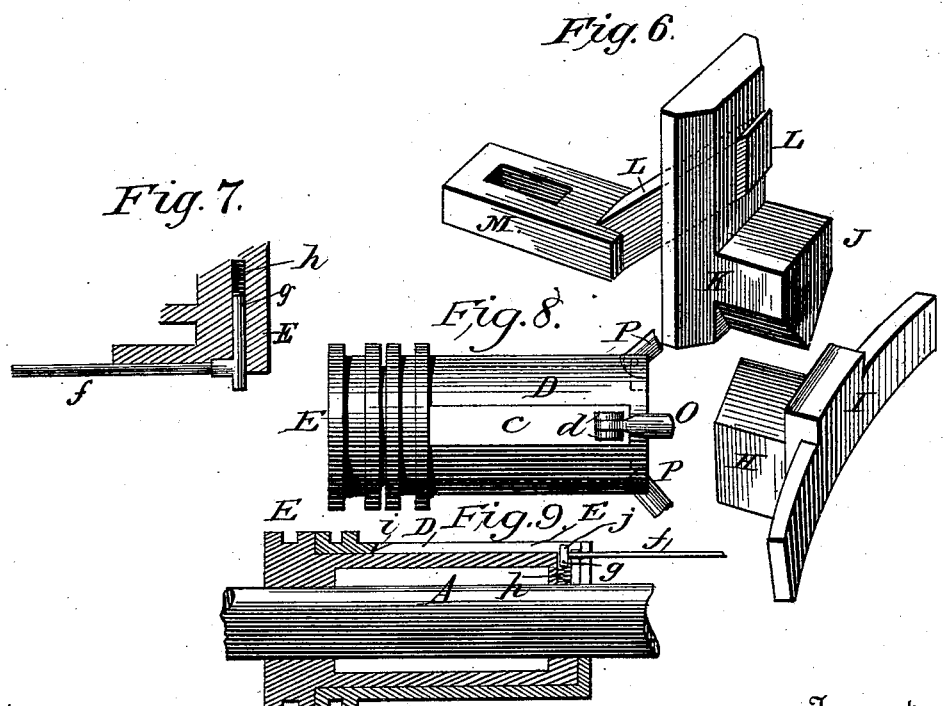
Fig. 6.
Fig. 7.
Fig. 8.
Fig. 9.
Witnesses
Fred G. Dieterich
H. A. Draper
Inventor
James Gibbins
B. Allen Webster
Attorney
N. PETERS, Photo-Lithographer, Washington, D. C.

UNITED STATES PATENT OFFICE.

JAMES GIBBINS, OF SPRINGFIELD, MASSACHUSETTS.

CLUTCH.

SPECIFICATION forming part of Letters Patent No. 396,079, dated January 15, 1889.

Application filed June 22, 1887. Serial No. 242,195. (No model.)

*To all whom it may concern:*

Be it known that I, JAMES GIBBINS, a citizen of the United States of America, residing in Springfield, Hampden county, Massachusetts, have invented new and useful Improvements in Clutches or Couplings, of which the following is a specification, reference being had to the accompanying drawings and letters of reference marked thereon.

Many of the clutches and couplings heretofore made have been defective, because the construction has been such that they are liable to be broken if they are coupled while a part is in motion. Many are also defective because of being complicated and difficult to operate and easily gotten out of repair. In some of the clutches also, where both a positive and friction lock has been used, the construction has been such that the positive locking-jaws could be caused to engage before the friction-surfaces are carried home, thus suddenly starting the machinery and subjecting the clutch, shafting, and machines to a jar and injury resulting from such operation, or the two systems have not been independently operative.

The object of my invention is to provide a clutch or coupling which shall be free from the objectionable features above mentioned and heretofore existing, and to provide a clutch or coupling having a friction and a positive locking means, and having the operating means so arranged that the friction locking means will be caused to engage before the positive locking mechanism is brought into operation, and so arranged that the positive mechanism cannot be operated until after the complete operation of the friction locking mechanism.

My object is also to provide an improved construction and arrangement in detail, as hereinafter set forth; and to that end my invention consists in the construction and arrangement as herein set out, whereby the objects of my invention are attained; and, further, my invention consists in the construction and arrangement of the various parts in detail and their combination, whereby an improved construction of clutch is produced, all as pointed out in the claims.

Figure 1:
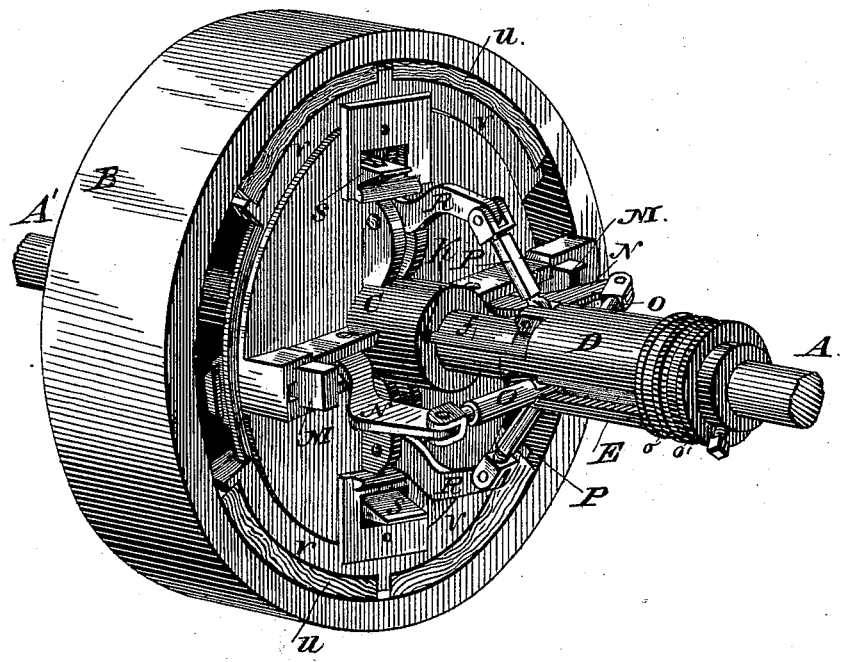
Figure 2:
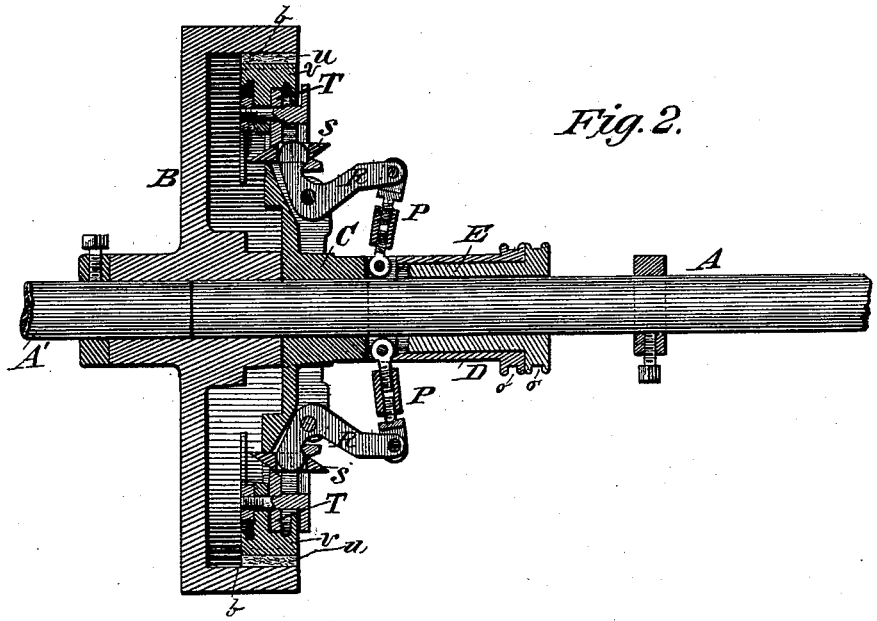
Figure 3:
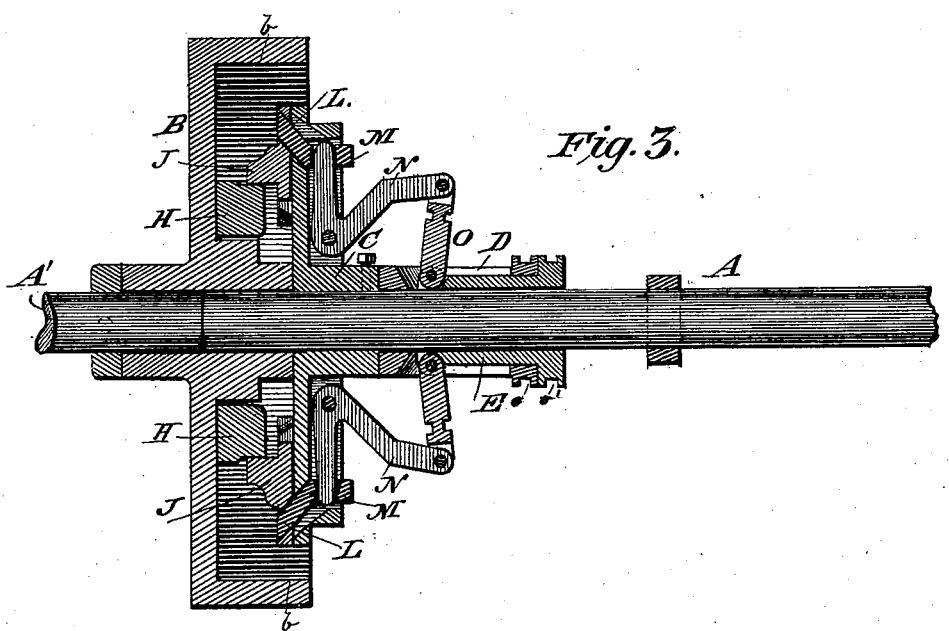

In the accompanying drawings, in which like letters of reference indicate like parts, Figure 1 is a perspective view of the complete device. Fig. 2 is a longitudinal sectional view, illustrating the mechanism of the frictional clutch portion of the device. Fig. 3 is a like view illustrating the mechanism of the positive clutch portion of the device. Fig. 4 is a face or inside view of the shell with parts attached. Fig. 5 is a view of the inner face of the plate with parts attached. Fig. 6 is a perspective view, on an enlarged scale, of the positive locking-jaws. Fig. 7 is a view of the stop-lock. Fig. 8 is a side view of the operating-collars D and E as seen from the top of Fig. 3; and Fig. 9 is a side view of the collars in section, illustrating the operation of the stop.

Referring to the drawings in detail, A indicates a shaft, which may be in one or two parts; B, the shell portion of the device; C, the plate; D, the collar to which the levers operating the friction mechanism are attached; E, the collar to which the levers operating the positive locking mechanism are attached; *f*, the stop; H, the positive locking-jaws carried by the shell; I, the parts to which these jaws are attached; J, the movable positive locking-jaws carried by the plate; K, the movable blocks to which the jaws J are attached; L, the inclined parts giving direct motion to the blocks K and jaws J; M, the block or part to which the part L is secured; N, bell-crank levers which assist in the operation of the positive locking mechanism; O, levers forming connection between the bell-crank levers N and the collar E; R, bell-crank levers which assist in the operation of the frictional mechanism; P, levers forming connection between the collar D and the bell-crank levers R; S, wedge-shaped or inclined pieces which operate to move the friction-block supports; *v*, friction-block supports; T, part forming connection between the wedge-shaped pieces S and the friction-block supports *v*, and *u* friction-blocks, of wood or other material, mounted upon the supports *v*.

The construction and operation will be readily understood on reference to the drawings.

The friction-clutch mechanism, being first described, consists of a shell, B, substantially as shown in the drawings, having an overhanging part, b, against the inner surface of which the friction-blocks u are caused to bear by the carrying of the collar D toward the clutch, thus causing the levers P to be forced outward to the position substantially as shown in Fig. 2, thus forcing outwardly the ends of the bell-crank levers R, to which they are attached, which movement forces the opposite ends of the bell-crank levers R inwardly toward the interior of the clutch, carrying the wedge-shaped pieces S in the same direction, and causing the parts T, which ride upon the parts S, to be moved away from the center of the clutch, and the friction-block supports v, being attached to the parts T, will be carried in the same direction, thus forcing the friction-blocks u, which are mounted on their supports v, in contact with the inner face, b, of the shell B, and causing the shell and plate to revolve together.

The collar D, to which the friction mechanism is attached, slides over the collar E, as shown in Figs. 2 and 3, and operates independently of it and the positive mechanism, an opening, c, being made in each side of the collar D to permit it to move without interfering with the ears d on the collar E, so that the friction mechanism may be applied without reference to the other parts of the device. The arrangement of the mechanism, however, is such that the positive clutch-jaws cannot be brought into operation until after the friction mechanism is fully operated, the object being to give the machinery a gradual and easy start and prevent the strain and jar which would result were the positive jaws used alone or brought into action before the friction mechanism has operated to start the machinery.

Describing now the positive clutch mechanism, it is as follows: A collar, E, partially inclosed within a collar, D, has pivotally secured to it the levers O, which at their opposite ends are secured to the ends of bell-crank levers N, which levers are pivoted to the plate, as shown, and engage at their opposite ends with the blocks M. The inclined part L of the block M passes through an opening in the block K of sufficient size to receive and fit the same. If now the collar E be moved toward the plate, it will force the levers O to a position more nearly perpendicular with the shaft, thus carrying the ends of the lever N to which the levers O are attached outward, thus forcing the opposite ends of the levers O inward or toward the shell, carrying with them the blocks M and inclined parts L, causing the blocks K to traverse the incline, and thus forcing the blocks K and jaws J, attached thereto, toward the center, and causing the jaws J to engage with the jaws H on the shell, and as long as the jaws J and H are in contact they will cause the two parts (the plate and shell) to revolve together.

To insure the going home of the friction mechanism before the positive mechanism is brought into operation, I provide a stop or lock, the preferred form being that shown in the drawings, the same being the arrangement of a pin, f, (see Fig. 7,) having a stem, g, fitting within a recess in the collar E and provided with a spring, h, to force the same outward. The collar D is provided with an inclined part, i, which, when it reaches the part j of the stop-pin f, forces the stem g into the recess, thus bringing the outer end of stop f opposite an opening, k, in the plate C. The stop f is brought to this position when the collar D is moved far enough to force the friction mechanism into operation, and until that time the stop is held away from the opening k by the operation of the spring h. When, therefore, the collar D is moved home, as before stated, to put in operation the friction mechanism and cause the friction-blocks W to bear against the friction-face of the shell, the end of the stop-pin f, being opposite the opening k, will permit the collar E to be moved to put in operation the positive mechanism, the pin entering the opening k when the collar E is moved, as stated. Thus it will be seen that the positive mechanism cannot be put in operation until after the friction mechanism is fully operated, and the danger resulting from a sudden coupling of the plate and shell will be avoided.

For the purpose of adjustment, and to compensate for the wear of the friction-blocks u, and to adjust the positive jaws J, the levers O and P are provided with reversely-threaded adjusting screws or collars l, which, on being turned, will lengthen or shorten these levers.

To insure the going home of the positive jaws J when moved through the operating mechanism, and to prevent their being stopped without locking, as would be the case were the jaws H immovably fixed to the shell and the operating mechanism brought into operation when the jaws J were directly opposite or in register with the jaws H, I arrange the jaws H in such manner that they may be moved sufficiently to permit the jaws J to be carried home to their locking position, and to facilitate this operation I make the jaws wedge-shaped and secure the jaws H to a part, I, which may be made integral with the jaws H. I provide the shell with boxes or parts m, in which are recesses to receive the ends of parts I, and a spring, a, in each recess serves to maintain the jaws H in a central position when not in use. When, however, the jaws J are brought in contact with the jaws H under strain, the jaws H will be moved until the sides of these jaws come in contact with the boxes m on one side or the other, depending on the direction of revolution, and will there come to a stop. Suitable shipper-collars are applied to the collars D and E at the grooves or recesses o o'.

It will readily be seen that many of the parts may be modified without departing from my invention.

Having therefore described my invention, what I claim, and desire to secure by Letters Patent, is—

1. The combination, in a clutch, of friction engaging mechanism and positive engaging mechanism, each independently operative, two operating-collars supported on the same shaft with the clutch, and levers connecting the collars with their respective parts, whereby the movement of one collar causes the friction engaging mechanism to operate and movement of the other collar causes the positive mechanism to operate, and a stop to prevent the operation of the positive mechanism until the friction mechanism is fully operated, substantially as shown and described.

2. A clutch having friction parts and positive engaging-jaws operating independently, and a stop whereby the positive operative mechanism cannot be brought into action until after the friction-connection is made, substantially as shown.

3. A clutch having positive jaws, one or both sets of which have inclined faces, one set of which give sidewise, whereby the other set will engage therewith when forced in contact, substantially as described.

4. In a clutch, the combination of a shell, as B, having jaws, as H, and a friction-surface, as b, with a plate, as C, carrying movable jaws, as J, and friction-blocks U, and means whereby the said movable parts are operated, substantially as shown.

5. In a clutch, the combination of a plate provided with movable jaws, as J, and inclined pieces L, engaging therewith, as shown, and bell-crank levers to move the pieces L, whereby the jaws are caused to traverse the incline and be moved to engage or disengage the jaws on a part, as B, substantially as shown.

6. In a clutch, the combination of independently-operating positive and friction engaging means with a stop to prevent operation of the positive mechanism until the friction mechanism is home, and means to cause the stop to cease to act by the complete operation of the frictional mechanism, substantially as shown.

7. A shell or part, as B, provided with positive locking-jaws, in combination with a plate or part, as C, having jaws, as J, movably secured thereto, and inclined pieces L, secured to parts M, and a collar, as E, connected with the parts M through the levers, as O and N, substantially as shown.

8. In a clutch having friction and positive engaging mechanism, the combination of two collars, as D and E, one being connected with the friction mechanism and the other with the positive mechanism, and a stop operating to prevent the locking movement of the positive locking means until the friction locking means is operated, said collars being connected with the jaws and friction-blocks by a system of levers, substantially as shown.

9. The combination of collars E D, one partially within the other, with plate C, having movable jaws and friction-blocks, and shell B, having jaws, as H, and the connecting-levers O and P, and bell-crank levers, all substantially as shown.

10. Collars D E, having operating-levers provided with adjusting-collars l, in combination with positive and frictional engaging means and connecting-levers, substantially as described.

JAMES GIBBINS.

Witnesses:
ALLEN WEBSTER,
GEORG E. READ.